United States Patent
Hubenthal et al.

(10) Patent No.: US 8,529,380 B1
(45) Date of Patent: Sep. 10, 2013

(54) APPARATUS, SYSTEM AND METHOD FOR GOLF CLUB RECOMMENDATION

(76) Inventors: Dale Edward Hubenthal, Stafford, VA (US); Robert James Lee, Stafford, VA (US)

(*) Notice: Subject to any disclaimer, the term of this patent is extended or adjusted under 35 U.S.C. 154(b) by 0 days.

(21) Appl. No.: 13/589,760

(22) Filed: Aug. 20, 2012

(51) Int. Cl.
  *A63B 57/00* (2006.01)
(52) U.S. Cl.
  USPC ............................ 473/407; 473/222; 473/223
(58) Field of Classification Search
  USPC .......................................... 473/222, 223, 407
  See application file for complete search history.

(56) References Cited

U.S. PATENT DOCUMENTS

| | | | | |
|---|---|---|---|---|
| 4,815,020 A | * | 3/1989 | Cormier ......................... | 473/407 |
| 5,294,110 A | * | 3/1994 | Jenkins et al. .................. | 473/407 |
| 5,364,093 A | * | 11/1994 | Huston et al. .................. | 473/407 |
| 5,434,789 A | * | 7/1995 | Fraker et al. ................... | 473/407 |
| 5,591,088 A | * | 1/1997 | Bianco et al. .................. | 473/131 |
| 5,664,880 A | * | 9/1997 | Johnson et al. ................ | 473/407 |
| 5,689,431 A | * | 11/1997 | Rudow et al. .................. | 701/207 |
| 5,779,566 A | * | 7/1998 | Wilens ........................... | 473/407 |
| 5,797,809 A | * | 8/1998 | Hyuga ........................... | 473/407 |
| 5,810,680 A | * | 9/1998 | Lobb et al. ..................... | 473/407 |
| 5,878,369 A | * | 3/1999 | Rudow et al. .................. | 701/470 |
| 6,059,672 A | * | 5/2000 | Zeiner-Gundersen ........ | 473/407 |
| 6,263,279 B1 | * | 7/2001 | Bianco et al. .................. | 701/450 |
| 6,456,938 B1 | * | 9/2002 | Barnard ......................... | 701/454 |
| 6,592,473 B2 | * | 7/2003 | McDonald et al. ........... | 473/407 |
| 8,070,628 B2 | * | 12/2011 | Denton et al. ................. | 473/407 |
| 8,303,311 B2 | * | 11/2012 | Forest ............................ | 434/252 |
| 8,314,923 B2 | * | 11/2012 | York et al. ..................... | 356/4.01 |
| 8,355,869 B2 | * | 1/2013 | Balardeta et al. ............. | 701/532 |
| 2002/0019677 A1 | * | 2/2002 | Lee ................................ | 700/91 |
| 2004/0147329 A1 | * | 7/2004 | Meadows et al. ............. | 473/131 |
| 2007/0197314 A1 | * | 8/2007 | York et al. ..................... | 473/407 |
| 2009/0082139 A1 | * | 3/2009 | Hart ............................... | 473/407 |
| 2011/0183779 A1 | * | 7/2011 | Baker et al. .................... | 473/407 |
| 2011/0230986 A1 | * | 9/2011 | Lafortune et al. ............. | 700/93 |
| 2011/0237358 A1 | * | 9/2011 | Carpenter ...................... | 473/407 |
| 2012/0053708 A1 | * | 3/2012 | Bonito ........................... | 700/92 |
| 2012/0289354 A1 | * | 11/2012 | Cottam et al. ................. | 473/223 |

OTHER PUBLICATIONS

Description of ES12 Digital Golf Assistant, published by Sports Entertainment Specialists, Inc., available on or before Mar. 7, 2012, and retrieved from URL <http://web.archive.org/web/20120307050233/http://www.sportsentertainmentspecialists.com/es12-launch-monitor.html>, 4 pages.*

Descrption of ES12, published by Ernest Sports, available on or before Feb. 3, 2012, and retrieved from URL <http://web.archive.org/web/20120203004631/http://www.ernestsports.com/es12>, 13 pages.*

ES12 User Manual, published by Ernest Sports, available on or before Sep. 30, 2013, and retrieved from URL <http://ernestsports.com/wp-content/uploads/2013/02/ES12-User-Manual-September-2013.pdf>, 18 pages.*

* cited by examiner

*Primary Examiner* — William Brewster
*Assistant Examiner* — Jason Skaarup
(74) *Attorney, Agent, or Firm* — Maier & Maier PLLC (57) ABSTRACT

A method for gold club recommendation. The method can include providing user data related to a user, the user data including a user's gender, and handicap, and a plurality of golf clubs associated with the user, providing golf club data related to each golf club of the plurality of golf clubs, the golf club data including average yardages and deviation limits, determining a starting location of a user on a golf course, determining a final location where the user intends to land a golf ball, accessing the golf club data for each golf club of the plurality of golf clubs, determining at least one recommended golf club for the user based on the golf club data, and displaying the recommended golf club to the user.

16 Claims, 6 Drawing Sheets

| DRIVER | 2 WOOD | 3 WOOD | 4 WOOD |
|---|---|---|---|
| 5 WOOD | 7 WOOD | 2 HYBRID | 3 HYBRID |
| 4 HYBRID | 5 HYBRID | 6 HYBRID | 1 IRON |
| 2 IRON | 3 IRON | 4 IRON | 5 IRON |
| 6 IRON | 7 IRON | 8 IRON | 9 IRON |
| P WEDGE | S WEDGE | A WEDGE | L WEDGE |
| 52° WEDGE | 54° WEDGE | 56° WEDGE | 58° WEDGE |
| 60° WEDGE | 64° WEDGE | PUTTER | |

*Fig. 3a*

| CLUB | MEN | | | WOMEN | | |
|---|---|---|---|---|---|---|
| | HANDICAP | | | HANDICAP | | |
| | 21+ | 20 - 10 | 9 - 0 | 21+ | 20 - 10 | 9 - 0 |
| DRIVER | 200 | 230 | 260 | 150 | 175 | 200 |
| 2 WOOD | 190 | 220 | 245 | 135 | 160 | 190 |
| 3 WOOD | 180 | 215 | 235 | 125 | 150 | 180 |
| 4 WOOD | 175 | 200 | 220 | 110 | 140 | 160 |
| 5 WOOD | 170 | 195 | 210 | 105 | 135 | 170 |
| 7 WOOD | 160 | 180 | 200 | 100 | 125 | 160 |
| 2 HYBRID | 170 | 195 | 210 | 105 | 135 | 170 |
| 3 HYBRID | 160 | 180 | 200 | 100 | 125 | 160 |
| 4 HYBRID | 150 | 170 | 185 | 90 | 120 | 150 |
| 5 HYBRID | 140 | 160 | 170 | 80 | 110 | 140 |
| 6 HYBRID | 130 | 150 | 160 | 70 | 100 | 130 |
| 1 IRON | 190 | 220 | 245 | 135 | 160 | 190 |
| 2 IRON | 180 | 215 | 235 | 125 | 150 | 180 |
| 3 IRON | 160 | 180 | 200 | 100 | 125 | 160 |
| 4 IRON | 150 | 170 | 185 | 90 | 120 | 150 |
| 5 IRON | 140 | 160 | 170 | 80 | 110 | 140 |
| 6 IRON | 130 | 150 | 160 | 70 | 100 | 130 |
| 7 IRON | 120 | 140 | 150 | 65 | 90 | 120 |
| 8 IRON | 110 | 130 | 140 | 60 | 80 | 110 |
| 9 IRON | 95 | 115 | 130 | 55 | 70 | 95 |
| PW | 80 | 105 | 120 | 50 | 60 | 80 |
| SW | 60 | 80 | 100 | 40 | 50 | 60 |
| AW | 55 | 75 | 90 | 35 | 45 | 55 |
| LW | 50 | 70 | 80 | 30 | 40 | 50 |
| 52° W | 55 | 75 | 95 | 35 | 45 | 55 |
| 54° W | 50 | 70 | 90 | 35 | 40 | 50 |
| 56° W | 45 | 65 | 85 | 30 | 35 | 45 |
| 58° W | 40 | 60 | 80 | 30 | 30 | 40 |
| 60° W | 35 | 55 | 75 | 25 | 25 | 35 |
| 64° W | 30 | 50 | 70 | 25 | 25 | 30 |
| PUTTER | N/A | N/A | N/A | N/A | N/A | N/A |

*Fig. 3b*

| CLUB | DEVIATION |
|---|---|
| 1 WOOD | 30 YARDS |
| 2-7 WOOD | 20 YARDS |
| 2-6 HYBRID | 15 YARDS |
| 1-4 IRON | 20 YARDS |
| 5-8 IRON | 15 YARDS |
| 9-60° IRON | 10 YARDS |

APPARATUS, SYSTEM AND METHOD FOR GOLF CLUB RECOMMENDATION

BACKGROUND

It is commonly known that the selection of a particular golf club from a set of golf clubs can depend on the distance that the player intends that the ball travel. However, other aspects can also influence the choice of club for a particular shot. Such aspects can include environmental factors such as wind speed, elevation, temperature, and so forth. Furthermore, a significant factor when choosing a club is the player's own past performance with the club. A system for golf club recommendation that takes into account various factors, including past performance, is therefore desired.

SUMMARY

According to at least one exemplary embodiment, a method for golf club recommendation is disclosed. The method can include providing user data related to a user, the user data including a user's gender, and handicap, and a plurality of golf clubs associated with the user, providing golf club data related to each golf club of the plurality of golf clubs, the golf club data including average yardages and deviation limits, determining a starting location of a user on a golf course, determining a final location where the user intends to land a golf ball, accessing the golf club data for each golf club of the plurality of golf clubs, determining at least one recommended golf club for the user based on the golf club data, and displaying the recommended golf clubs to the user.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of non-transitory computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

According to at least one exemplary embodiment, an apparatus, system and method for golf club recommendation may be disclosed. The embodiments disclosed herein can facilitate providing recommendations to a user as to which golf clubs to use in a particular location on the golf course. The recommendations may be based on a variety of factors, including, but not limited to: the lie of the ball, the weather conditions, the elevation of the target relative to the lie of the ball, the geography and layout of the particular hole, the handicap of the user, and so forth. Additionally, the user's past performance with a golf club or plurality of golf clubs may be factored into the provided recommendations.

Figure 1:
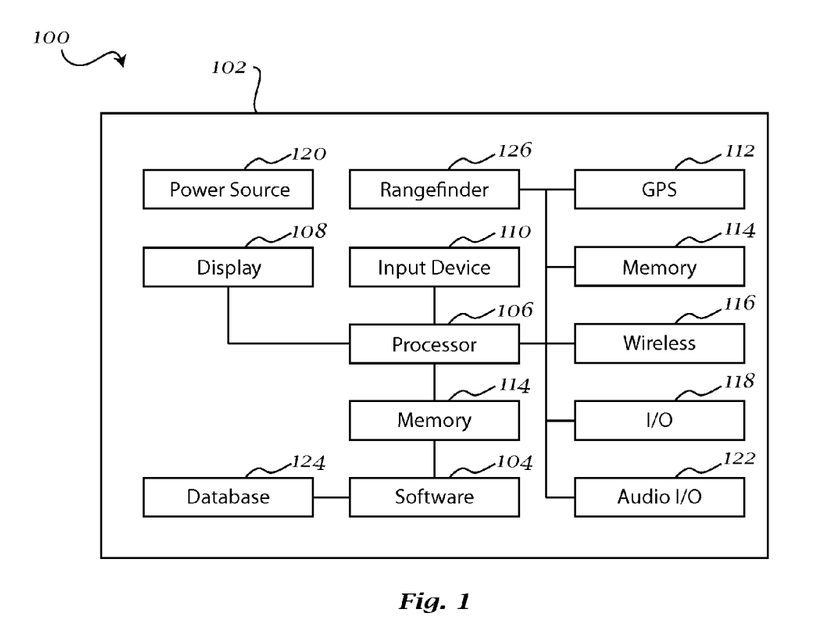
FIG. 1 is a diagram of an exemplary system for golf club recommendation.

FIG. 1 shows an exemplary system for golf club recommendation 100, including an apparatus 102 on which an exemplary method for golf club recommendation may be implemented, and software 104 for implementing the method for golf club recommendation. The apparatus 102 can include a processor 106, a display device 108, at least one input device 110, a GPS device 112, memory 114, a wireless communication device 116, input/output ports and slots 118, power source 120, sound input/output device 122, and any other desired features. In some exemplary embodiments, apparatus 102 can further include a rangefinder 126, which may be a laser or infrared rangefinder, or any other rangefinder known in the art. Additionally, the apparatus and any element described herein may include a smartphone or features commonly associated with a smartphone, tablet, or any similar device. Additionally, it may be appreciated that any exemplary embodiments described herein may be utilized on or with a smartphone, tablet, or any similar device. The various components of apparatus 102 may all be operatively connected. Display device 108 may be, for example, a color liquid crystal display, or any other display that enables system 100 to function as described herein. Input device 110 may include one or more user-operable buttons, keys, or any other input device that enables system 100 to function as described herein. Alternatively, display device 108 and at least one input device 110 may be provided as a touch-screen display, which may be operated by the user's fingers, a stylus, and so forth.

In at least one exemplary embodiment, the processor 106 and memory 114 can be provided by a microcontroller, as is known to one having ordinary skill in the art. Numerous microcontrollers are commercially available and can be selected by one having ordinary skill in the art for use with events recordation device embodiments. In addition to the conventional arithmetic and logic elements of a conventional general-purpose microprocessor, microcontrollers integrate additional elements, such as read-write memory for data storage, read-only memory, input/output interfaces, timers, drivers and the like. In a non-limiting manner, volatile memory can include RAM for data storage. In a non-limiting manner, non-volatile memory can include ROM, EPROM, EEPROM and Flash memory for program and operating parameter storage. In at least one exemplary embodiment, a microcontroller can include a LCD driver.

Software 104 may be stored on memory 114 and executed by processor 106. Software 104 may be operable to perform the methods as described further below. At least one database 124 may further be stored on memory 114 and accessible by software 104, so as to facilitate performing the methods described below.

System 100 may be operable to display, via display device 108, a visual representation of a golf course, a golf course hole, or a portion thereof. If desired, the portion of the hole that is displayed may be the portion of the hole that surrounds the location of apparatus 102. The location of apparatus 102 may be ascertained by system 100 via GPS device 112. System 100 can further be operable to display distances between the location of apparatus 102 and any hazards, and the distances between the location of apparatus 102 and the front, center and back of the green. System 100 can further be operable to display a visual representation of the green, the contours of the green, as well as the depth and topological features of the green. System 100 can also be operable to display any other points of interest on the particular hole. Additionally, system 100 may be operable to display a cursor on display device 108. The user can direct the cursor, by any desired input method, to any location on the displayed hole. System 100 can display the distance between the cursor and the location of apparatus 102.

Figure 2:
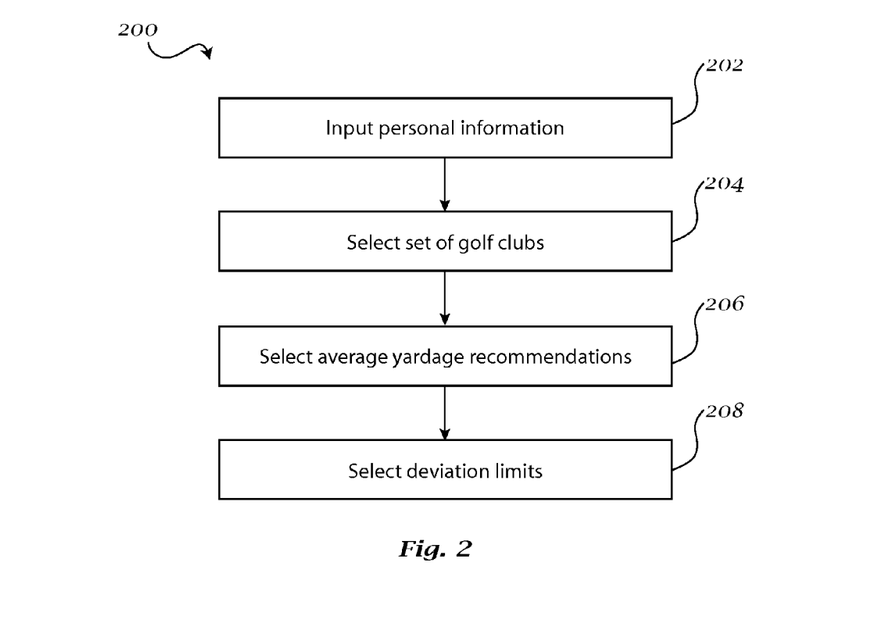
FIG. 2 shows an exemplary set up process for a system for golf club recommendation.
Figure 3A:
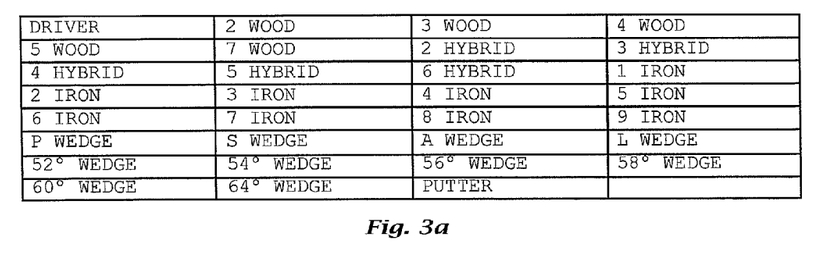
FIG. 3a is an exemplary default set of golf clubs for a system for golf club recommendation.
Figure 3B:
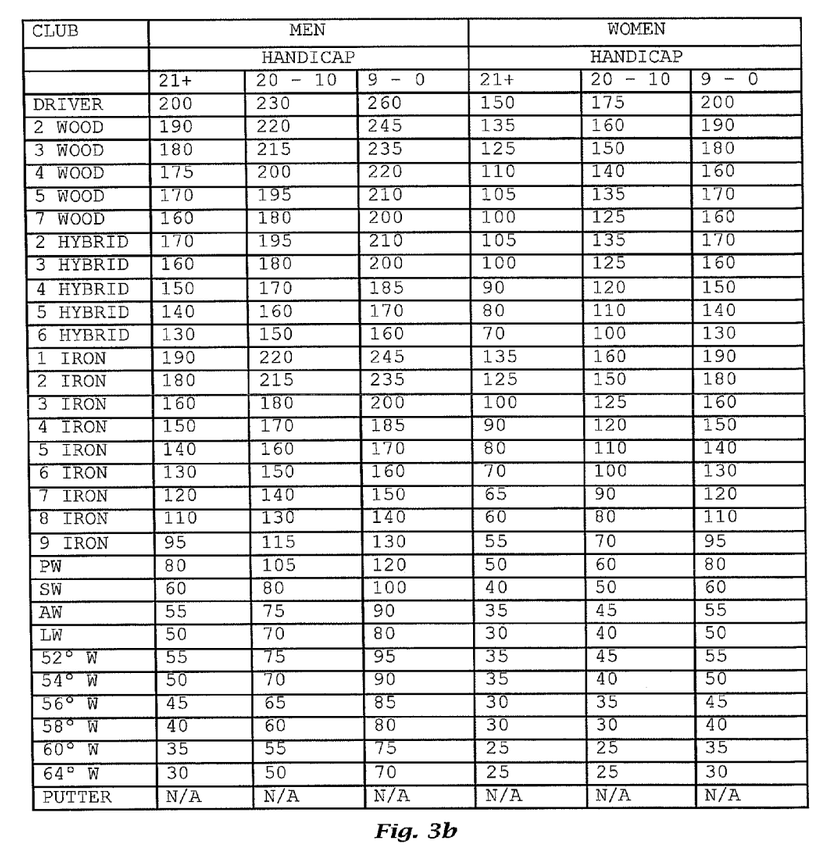
FIG. 3b is an exemplary default set of yardage recommendations for a system for golf club recommendation.

FIG. 2 shows an exemplary method 200 for set up of the software 102. The set up method may need to be performed once, although the user may later execute any portion of the set up method as often as desired to alter the set up parameters. At step 202, the user can input personal information regarding themselves. Such personal information may include, but is not limited to the user's gender and handicap. At step 204, the golf clubs that are used by the user may be selected. The selected golf clubs may be added to the user's "bag," which can store thirteen clubs plus a putter, or any other desired amount of clubs. System 100 may include a default set of golf clubs, an example of which is shown in FIG. 3a. However, if a user desires to add a golf club not present in the default set, or to remove any golf clubs, he may edit the set of golf clubs manually. At step 206, the average yardage recommendations for each club, based on gender and handicap, may be selected. Step 206 may be executed manually by the user when the system is in an "amateur mode". Step 206 may be also performed automatically by system 100 when the system is in a "semi-pro mode" or "pro mode"; for example, the system may include a default set of yardage recommendations, an example of which is shown in FIG. 3b. The system may then automatically select a set of yardage recommendations based on the gender handicap input by the user at step 202. However, the user may also edit the yardage recommendations manually by entering any desired yardage recommendation value based on gender, handicap, and inputted range for each club. In some exemplary embodiments, additional factors for yardage recommendations may be contemplated and provided as desired.

Figure 3C:
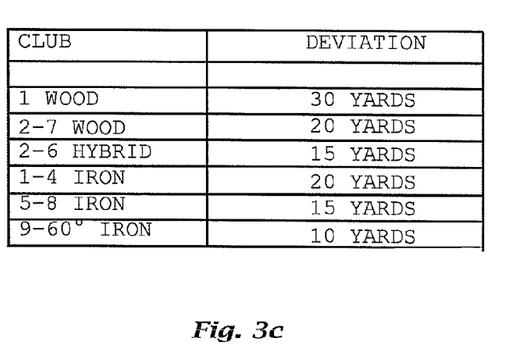
FIG. 3c is an exemplary default set of deviation limits for a system for golf club recommendation.

At step 208, deviation limits, in yards or meters, for each club, may be selected. System 100 may include a default set of deviation limits, an example of which is shown in FIG. 3c. The default deviation limits may be provided for each club, or may be provided for a range of clubs. However, the user may also edit the deviation limits manually for each club. The deviation limits may be entered within a range of, for example, between 0 to 30 yards, or any other desired range. The deviation limits may be utilized in conjunction with training system 100, as described further below.

Figure 4:
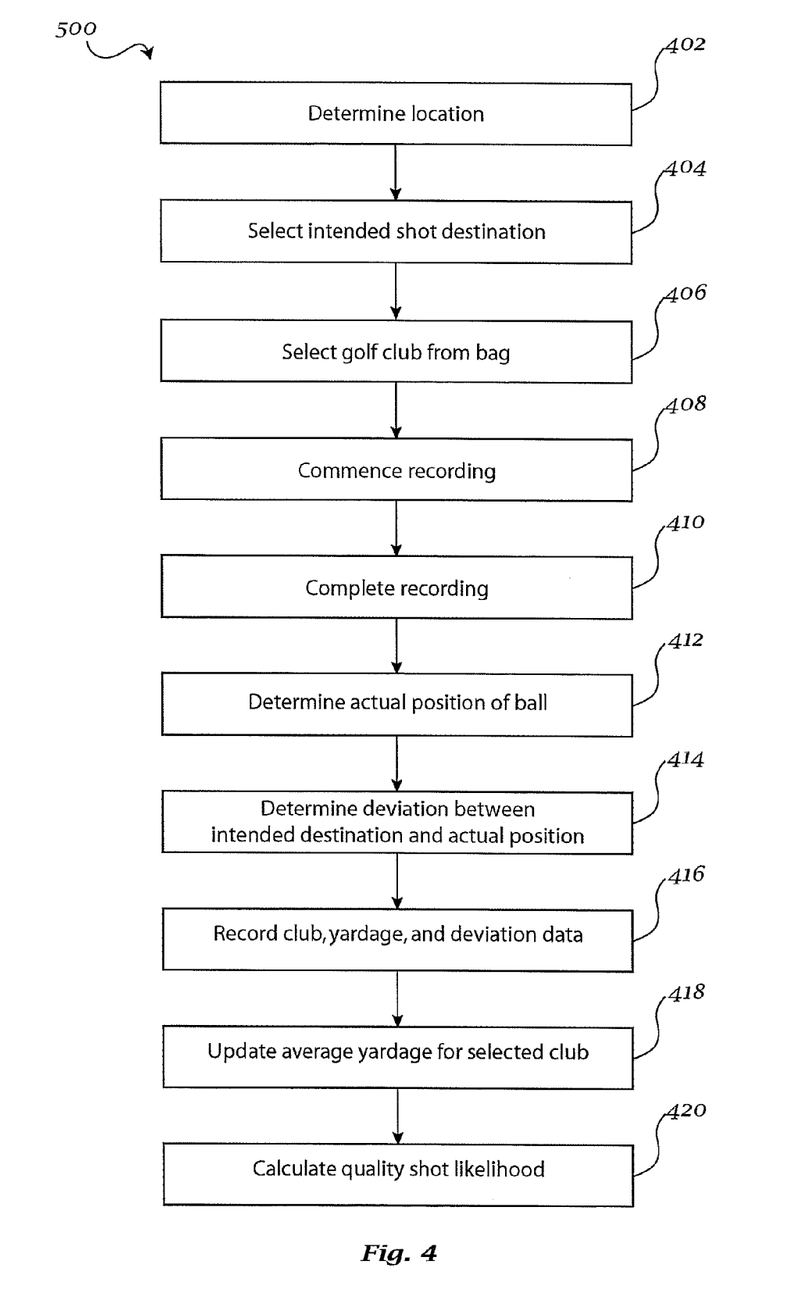
FIG. 4 is an exemplary training process for a system for golf club recommendation.

FIG. 4 shows an exemplary method for training the system for golf club recommendation 100. At step 402, the user's location at a particular hole may be determined. The user's location may be determined by ascertaining the location of the apparatus 102 via GPS device 112. System 100 may then compare the location of apparatus 102 to the location of a particular golf course hole or cursor, which may be stored in database 124, and which encompasses the current location of the apparatus. The specific location of the user on the golf hole may then be determined and displayed on display device 108. Additionally, the user may input which teeing area of the particular hole the user is playing from.

At step 404, the user can select the location on the hole where the user intends for the shot to land. This selection may be made, for example, by the user moving the cursor to the intended location on display device 108. If the user moves the cursor to the green, the intended location may default to the center of the green, for convenience. The user may adjust the intended location as desired. At step 406, the user can select a club from the user's bag with which the user intends to make a shot.

At step 408, the recording of the shot may commence. This can be initiated by the user, for example by selecting a "start recording shot" or "mark" widget on the interface. The initial location of the shot may be recorded by system 100 as the location of the apparatus 102 when the recording is initiated by the user. The location of apparatus 102 may again be ascertained via GPS device 112, as described above. If the apparatus 102 is in motion when recording is initiated by the user, the shot data may not be recorded. The initial location of the apparatus may be marked after a predetermined amount of time elapses after apparatus 102 becomes stationary, for example 60 seconds, 120 seconds, or any other desired amount of time.

At step 410, the recording of the shot may be completed or terminated. The user can complete the recording of the shot, for example by selecting a "stop recording shot" or "mark" widget on the interface. The distance of the shot, and the location of the lie of the ball after the shot is then recorded by system 100, at step 412, for example by determining the location of apparatus 102 via GPS device 112. At this point, he user can also mark the shot as landing in the fairway, the rough, a bunker, the green, and so forth.

At step 414, the system can evaluate the deviation between the intended location of the shot, and the recorded location of the lie of the ball after the shot. If the deviation between the two locations is within the given deviation value for the particular club, the shot may be marked as a "quality" shot. If the difference between the two locations is outside the given deviation value for the particular club, the shot may be marked as a "non-quality" shot. At step 416, the system can add the recorded shot, including yardage and deviation, to the set of recorded shots for the particular club used. The system can maintain any desired number of recorded shots for each club, for example 20 shots. The system can also maintain the number of putts for each round. The recorded shots can subsequently be used to provide golf club recommendations, as described further below. The recorded shots can also be displayed to the user in the form of a scorecard at the end of the round. At step 418, the system may calculate and store an average yardage for the particular club based on the set of recorded shots for the club. An average yardage may be calculated once at least five recorded shots are stored for the club. The system may be restricted solely to "quality" shots for calculating the average yardage. At step 420, the system may calculate a percentage likelihood for achieving a "quality" shot with the particular club, based on the proportion of "quality" and "non-quality" recorded shots stored for that particular club.

Figure 5:
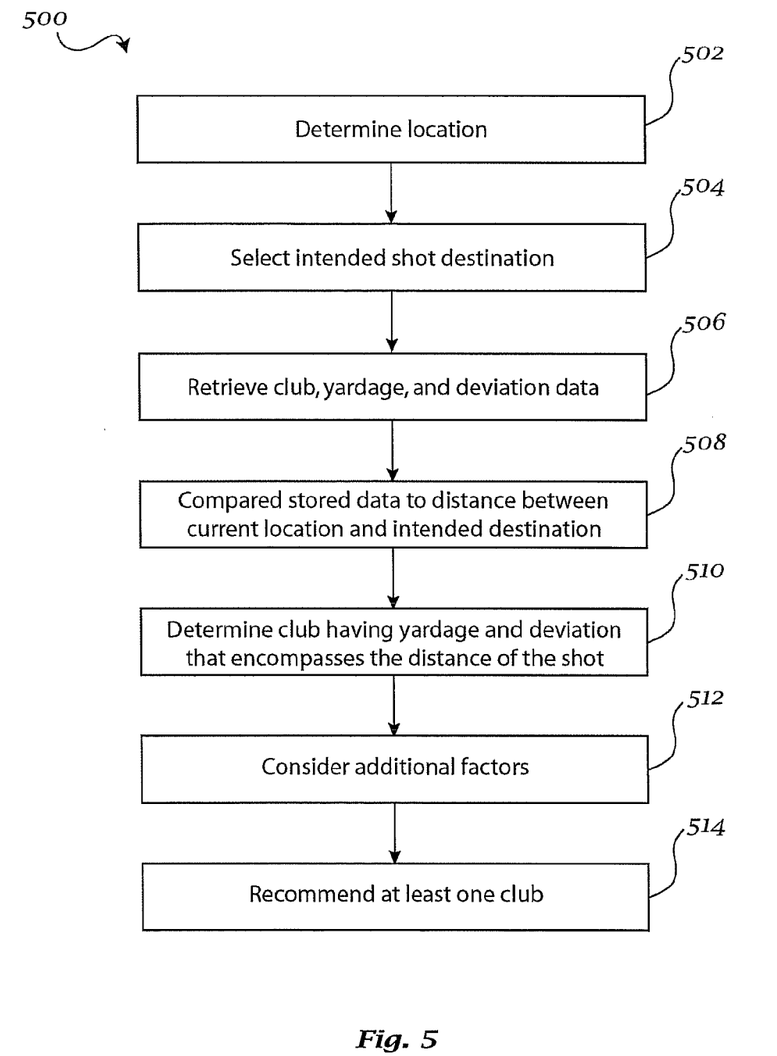
FIG. 5 is an exemplary recommendation process for a system for golf club recommendation.

FIG. 5 shows an exemplary method for golf club recommendation. At step 502, the user's location at a particular hole may be determined. The user's location may be determined by ascertaining the location of the apparatus 102 via GPS device 112. System 100 may then compare the location of apparatus 102 to the location on a particular golf course, which may be stored in database 124, and which encompasses the current location of the apparatus. The specific location of the user on the golf course may then be determined and displayed. Additionally, the user may input which teeing area of the particular hole the user is playing from. At step 504, the user can select the location on the hole where the user intends for the shot to land. This selection may be made, for example, by the user moving the cursor to the intended location on display device 108. If the user moves the cursor to the green, the intended location may default to the center of the green, for convenience. The user may adjust the intended location as desired.

At step 506, the system may access the stored average yardages, deviation limits and percentage likelihoods for all clubs currently in the user's bag. At step 508, the system can compare the stored average yardages to the distance between the user's location and the intended location of the shot. At step 510, the system can determine which club or clubs have an average yardage and deviation limit values that encompass the distance of the shot to be taken, and select that club or club for recommendation to the user.

In some exemplary embodiments, at step 512, the system may take additional factors into consideration for club recommendation. Such factors may include, but are not limited to, wind speed and direction, relative elevation between the user's location and the intended location of the shot, elevation above sea level, temperature, and lie conditions. Depending on the conditions, the system can adjust the selected club up or down by at least one-half club. For example, if the wind speed is between 0 mph and 4.9 mph, the system can make no adjustments to the selected club. If the wind speed is between 5 mph and 9.9 mph, the system can adjust the selected club by one-half club, upwards or downwards depending on wind direction. If the wind speed is between 10 mph and 19.9 mph, the system can adjust the selected club by one club, upwards or downwards depending on wind direction. Finally, if the wind speed is 20 mph or above, the system can adjust the selected club by two clubs, upwards or downwards depending on wind direction. Similarly, if the ambient temperature is over 50° F., the system can make no adjustments to the selected club. If the ambient temperature is below 50° F., the system can adjust the selected club upwards by one club. If the relative elevation differs by more than 10 yards, the system can adjust the selected club for every 10 yards of elevation difference; if the intended location of the shot is lower than the user's location, the system can adjust the selected club down, and if the intended location of the shot is higher than the user's location, the system can adjust the selected club up. If the elevation is greater than 2000 feet above sea level, the system can add 2% to the average yardage of the clubs for every 2000 feet above sea level. As to lie conditions, if the current lie is in the fairway or light rough, the system may not make any adjustments. However, if the current lie is in medium rough, the system can adjust the selected club by one club upwards if the intended location of the shot is over 100 yards away. If the current lie is in heavy rough, the system can adjust the selected club by two clubs upwards if the intended location of the shot is over 150 yards away. If the current lie is in a bunker, the system may recommend a sand wedge for a greenside bunker, and adjust one club upwards for a fairway bunker. The condition of the current lie may be input by the user or may be determined by the system based on the location of apparatus 102 and the layout of the golf course, which may be stored in database 124.

At step 514, the system can recommend the determined club to the user, and further display the percentage likelihood of making a quality shot with the club. If the distance of the shot to be taken is encompassed by the average yardage and deviation limit values of more than one club, the system can recommend all such clubs to the user. Out of this plurality of recommended clubs, the system can further mark the club with which the user has the best likelihood of making a quality shot, for example, by determining which of the plurality of recommended clubs has a quality shot percentage inside of the shot to be taken. Alternatively, the system can mark the club which has a higher yardage to the distance of the shot, out of the plurality of recommended clubs. The user may then select the recommended club and perform the shot.

Figure 6:
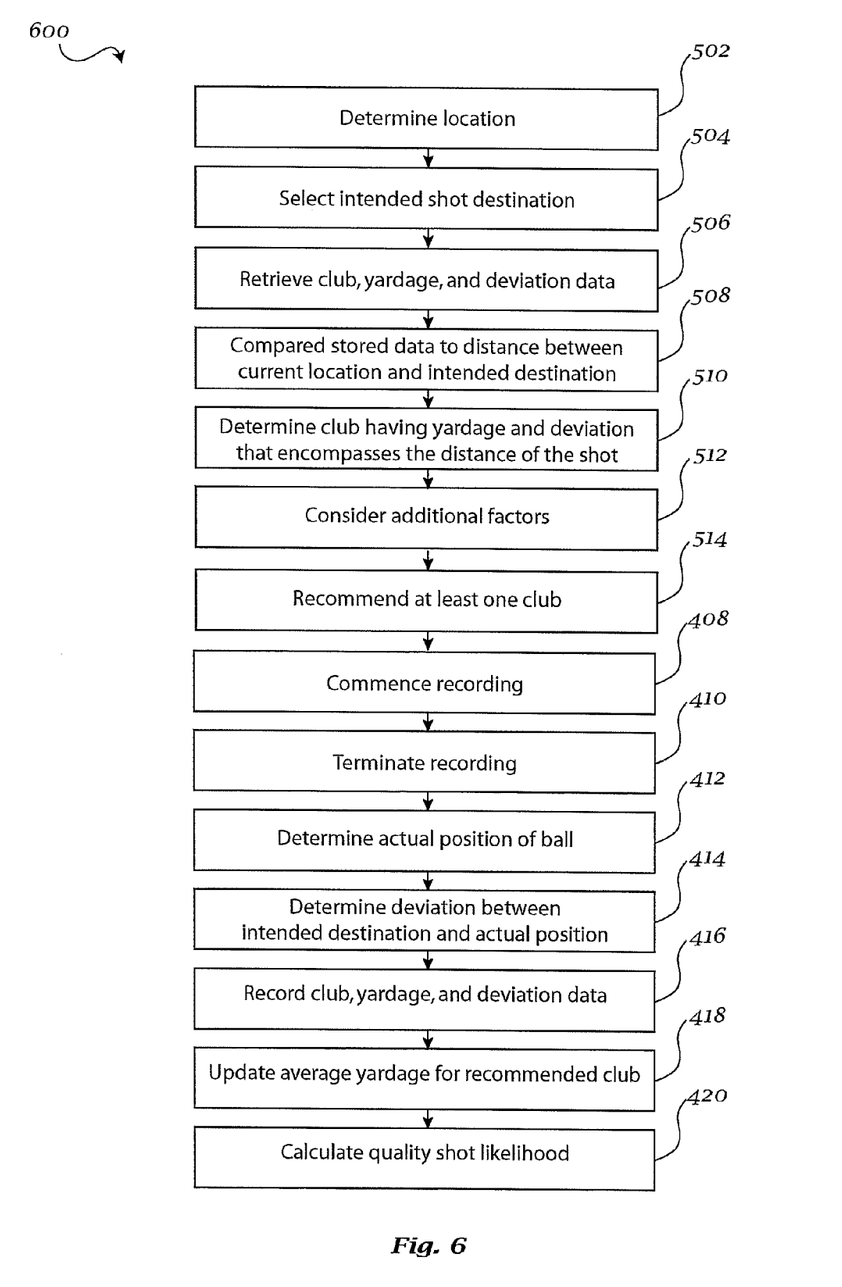
FIG. 6 is an exemplary combination learning and recommendation process for a system for golf club recommendation.

In some exemplary embodiments, once system 100 has performed training process 400 a sufficient amount of times to begin averaging recorded shot yardages, for example a sufficient amount of times to record five "quality" shots, training process 400 and recommendation process 500 may be performed simultaneously as a combination training and recommendation process 600, as shown in FIG. 6. In other words, the system may recommend a golf club for a particular shot, and then calculate and record the results of the shot, substantially as described above. The recorded shot average for each club can thus be maintained as a simple moving average, and the percentages likelihoods of achieving a "quality" shot may be calculated from a desired number of the most recent shots. This can enable system 100 to continuously adapt its recommendations to the user's performance as the user's performance evolves.

Portions of the interface of system 100 may be provided as voice messages to the user via sound output device 122. These voice messages may be recorded and may be stored in database 124. The voice messages may provide alerts and recommendations to the user. For example, the voice messages may alert the user regarding ambient conditions, such as wind speed, and provide club recommendations based on the ambient conditions. Furthermore, any communication between system 100 and the user that is described herein may be provided via voice messages.

The various features and user preferences of system 100 may be accessible via a user-operable menu interface, which may include various menu groupings related to game play, clubs, and user preferences. Game play menus can include shot options related to recording shots, tracking fairway shots, tracking putts, tracking penalty shots and tracking sand shots. Recording shots can allow the user to set whether the system records the shots performed during the round of golf that is currently being played. The recorded shots can further be subdivided into fairway shots, putts, penalty shots and sand shots. The user can toggle whether each of these shot categories is tracked and recorded. The game play menus can further include environmental factor settings, such as elevation, geography, temperature and wind. The elevation menu can allow the user to input the relative elevation between the user's location and the intended location of the shot so as allow system 100 to make appropriate recommendation adjustments, as described above. The geography menu can allow the user to input the elevation of the present course above sea level so as allow system 100 to make appropriate recommendation adjustments, as described above. The temperature and wind speed menus can allow the user to input the ambient temperature, wind speed, and direction so as allow system 100 to make appropriate recommendation adjustments, as described above.

In some exemplary embodiments, the game play interface of system 100 may allow the user to select an appropriate skill level, for example, an amateur, semi-professional or professional skill level. For each skill level, the system may provide different levels of assistance, and may also consider diverse numbers of factors in providing the assistance. For example, for the amateur skill level, the user may select desired golf clubs, but may also be restricted to using only the default values for the features, user preferences, and environmental factor settings. For the semi-pro skill level, the user may select desired golf clubs and may be able to adjust all the features, user preferences, and environmental factor settings. For the pro skill level, the user may the user may select desired golf clubs and may be able to adjust all the features and user preferences, but may be restricted from adjusting the environmental factor settings.

Club-related functionalities may be provided via a "my bag" menu grouping, which can include a club selection menu, a club averages menu, and a deviation limit menu. The club selection menu can allow the user to choose automatic or manual club selection, to edit the clubs located in the user's bag, and to input any clubs not present in the default selection, as described above. The club averages menu can allow the user to choose automatic or manual yardage recommendation, and to input yardage recommendations for each club, as described above. The deviation menu can allow the user to choose automatic or manual deviation limit selection, and to edit the deviation limits for each club, as described above.

User preference menus can include a GPS functions menu, date and time settings menu, measurement menu, target menu, sound menu, course download menu, handicap menu, and statistics menu. The GPS function menu can allow the user to reset the GPS system and to select the number of GPS satellites with which the system may communicate. The date and time menu can allow the user to input the date and time or to select automatic network time synchronization. The measurement menu can allow the user to choose metric or English units for use by the system. The target menu can allow the user to toggle the display of deviation rings around the intended location (target) of the shot. For shots to the green, the target menu can allow the user to determine whether the system defaults the intended shot location to the front, back, or center of the green. The sound menu can allow the user to toggle the voice message capabilities of the system, to record voice messages, and to select pre-recorded or user-recorded voice messages for the system to use. The course download menu can allow the user to retrieve course maps and any other desired course data from another location, such as a web site, internet server, or personal computing device. The handicap menu can allow the user to select automatic or manual handicaps, to edit the handicap values as well as to toggle automatic adjustment of handicaps based on recorded shots, as described above. The statistics menu can allow the user to toggle the display of game statistics, such as fairway shots, green shots, hazard shots, putts, and scorecards. For example, the user can toggle the statistics to be displayed after 18 holes, after 9 holes, or after each hole.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for golf club recommendation on a portable apparatus including software executed by a processor configured to perform the steps of:
    providing user data related to a user, the user data including a user's gender, and handicap, and a plurality of golf clubs associated with the user;
    providing golf club data related to each golf club of the plurality of golf clubs, the golf club data including average yardages and deviation limits;
    determining a starting location of a shot on a golf course;
    determining an intended final location where the user intends to land a golf ball;
    accessing the golf club data for each golf club of the plurality of golf clubs;
    determining at least one recommended golf club for the user based on the golf club data;
    displaying the recommended golf club to the user;
    determining an actual golf club from the plurality of golf clubs used in the shot;
    determining an actual final location of the shot;
    calculating a distance between the starting location of the shot and the actual final location of the shot;
    calculating a deviation between the intended final location and the actual final location;
    storing, in a database, the calculated distance as corresponding to the actual golf club used in the shot;
    providing a predetermined deviation limit for the actual golf club;
    comparing the deviation between the intended final location and the actual final location to the deviation limit;
    marking the shot as a quality shot if the deviation is less than the deviation limit; and
    updating the golf club data for the actual golf club based on the deviation between the intended final location and the actual final location, and whether the shot was marked as a quality shot.

2. The method of claim 1, further comprising:
    determining the at least one recommended golf club for the user based on the golf club data and at least one of a plurality of additional factors;
    wherein the additional factors comprise wind speed and direction, relative elevation, elevation above sea level, temperature, and lie conditions.

3. The method of claim 1, wherein providing golf club data further comprises providing default average yardage and deviation limits for each club of the plurality of clubs.

4. The method of claim 1, further comprising:
   averaging a plurality of calculated distances for each club of the plurality of golf clubs so as to calculate a yardage recommendation for the golf clubs.

5. The method of claim 4, wherein determining the at least one recommended golf club for the user based on the golf club data further comprises:
   calculating a distance between the starting location of the shot on a golf course and the intended final location where the user intends to land the golf ball;
   comparing the calculated distance to the yardage recommendation and deviation limit for each golf club of the plurality of golf clubs;
   selecting at least one golf club of the plurality of golf clubs, wherein the calculated distance is within the deviation value of the yardage recommendation of the selected golf club.

6. The method of claim 4, wherein the calculated distances used for averaging consist of calculated distances for quality shots.

7. The method of claim 1, wherein determining a final location comprises:
   providing a visual representation of a golf course hole;
   prompting the user to indicate the intended final location of the golf ball using the visual representation of the golf course hole.

8. The method of claim 1, wherein determining a starting location of a shot comprises utilizing a global positioning device to ascertain the starting location.

9. The method of claim 1, wherein determining a starting location of a shot comprises utilizing a range finder to ascertain the starting location.

10. A system for golf club recommendation, comprising:
    a portable apparatus, the portable apparatus comprising a processor, memory, a display device, at least one input device, a GPS device, and a non-volatile medium storing a database and software;
    wherein the database comprises data relating to a user, the user data including a user's gender, and handicap, and a plurality of golf clubs associated with the user;
    wherein the database further comprises golf club data related to each golf club of the plurality of golf clubs, the golf club data including average yardages and deviation limits;
    wherein the software is executed by a processor and operable to determine a starting location of a shot on a golf course, determine an intended final location where the user intends to land a golf ball, access the golf club data for each golf club of the plurality of golf clubs, determine at least one recommended golf club for the user based on the golf club data, and display the recommended golf club to the user;
    determine an actual golf club from the plurality of golf clubs used in the shot;
    determine an actual final location of the shot;
    calculate a deviation between the intended final location and the actual final location;
    store, in the database, the calculated distance as corresponding to the actual golf club used in the shot;
    provide a predetermined deviation limit for the actual golf club;
    compare the deviation between the intended final location and the actual final location to the deviation limit;
    mark the shot as a quality shot if the deviation is less than the deviation limit; and
    update the golf club data for the actual golf club based on the deviation between the intended final location and the actual final location, and whether the shot was marked as a quality shot.

11. The system of claim 10, wherein the software is further operable to average a plurality of calculated distances for each club of the plurality of golf clubs so as to calculate a yardage recommendation for the golf club.

12. The system of claim 11, wherein the software is further operable to:
    calculate the distance between the starting location of the shot on a golf course and the intended final location where the user intends to land the golf ball;
    compare the calculated distance to the yardage recommendation and deviation limit for each golf club of the plurality of golf clubs;
    select at least one golf club of the plurality of golf clubs, wherein the calculated distance is within the deviation value of the yardage recommendation of the selected golf club.

13. The system of claim 12, wherein the calculated distances used for averaging consist of calculated distances for quality shots.

14. The system of claim 10, wherein the system is further operable to:
    provide a visual representation of a golf course hole;
    prompt the user to indicate the intended final location of the golf ball using the visual representation of the golf course hole.

15. The system of claim 10, wherein the apparatus further comprises at least one rangefinder device.

16. The system of claim 10, wherein the apparatus further comprises a wireless communication device.

* * * * *